United States Patent
Wang et al.

(10) Patent No.: US 11,695,185 B2
(45) Date of Patent: Jul. 4, 2023

(54) SEPARATOR INCLUDING POROUS SUBSTRATE LAYER, METAL OXIDE INTERMEDIATE LAYER, AND CERAMIC COATING LAYER, METHOD OF PREPARING THE SAME AND LITHIUM-ION BATTERY INCLUDING THE SAME

(71) Applicant: CALB Technology Co., Ltd., Changzhou (CN)

(72) Inventors: Zhenyu Wang, Changzhou (CN); Haiwen Wang, Changzhou (CN)

(73) Assignee: CALB Technology Co., Ltd., Jiangsu (CN)

( * ) Notice: Subject to any disclaimer, the term of this patent is extended or adjusted under 35 U.S.C. 154(b) by 286 days.

(21) Appl. No.: 17/012,053

(22) Filed: Sep. 4, 2020

(65) Prior Publication Data

US 2021/0296626 A1     Sep. 23, 2021

(30) Foreign Application Priority Data

Mar. 20, 2020   (CN) .......................... 202010199106.4

(51) Int. Cl.
*H01M 50/431* (2021.01)
*H01M 50/403* (2021.01)
*H01M 10/0525* (2010.01)

(52) U.S. Cl.
CPC ..... *H01M 50/431* (2021.01); *H01M 10/0525* (2013.01); *H01M 50/403* (2021.01)

(58) Field of Classification Search
CPC ............................ H01M 50/431; H01M 50/403
USPC ........................................ 429/144, 251, 254
See application file for complete search history.

(56) References Cited

U.S. PATENT DOCUMENTS

2011/0027658 A1    2/2011   Kim et al.

FOREIGN PATENT DOCUMENTS

| CN | 106159159 | | 11/2016 | | |
|---|---|---|---|---|---|
| CN | 108140784 | | 6/2018 | | |
| CN | 109904371 | | 6/2019 | | |
| CN | 109950461 | | 6/2019 | | |
| CN | 109950461 | A | * 6/2019 | | |
| CN | 106299195 | | 2/2020 | | |
| EP | 3108533 | | 12/2016 | | |
| EP | 3506395 | | 7/2019 | | |
| EP | 3512000 | | 7/2019 | | |
| JP | 2015053180 | | 3/2015 | | |
| KR | 2016126503 | A | * 11/2016 | .......... | H01M 2/1646 |
| WO | 2014183656 | | 11/2014 | | |

OTHER PUBLICATIONS

Etzler et al., Particle Size Analysis: a Comparative Study of Various Methods, Oct. 1995, Particle & Particle Systems Characterizations, 12, 217-224 (Year: 1995).*
Etzler et al., Particle Size Analysis: A Comparison of Various Methods II, Dec. 1997, Particle & Particle Systems Characterizations, 14 , 278-282 (Year: 1997).*
Brewer et al., Particle Size Determination by Automated Microscopical Imaging Analysis with Comparison to Laser Diffraction, Apr. 1995, Journal of Pharmaceutical Sciences, 84, 499-501 (Year: 1995).*
Xu et al., Comparison of sizing small particles using different technologies, 2003, Powder Technology, 132, 145-153 (Year: 2003).*
"Office Action of China Counterpart Application", with English translation thereof, dated Mar. 30, 2022, p. 1-p. 23.
Xinhua Liang, et al., "Novel Processing to Produce Polymer/Ceramic Nanocomposites by Atomic Layer Deposition", Journal of the American Chemical Society, vol. 90, Issue1, Nov. 7, 2006, pp. 57-63.
"Search Report of Europe Counterpart Application", dated Feb. 10, 2021, p. 1-p. 11.

* cited by examiner

Primary Examiner — Sean P Cullen
(74) Attorney, Agent, or Firm — JCIP Global Inc.

(57) ABSTRACT

A separator including a porous substrate layer, an intermediate layer, and a ceramic coating layer is provided. The ceramic coating layer is disposed on a side of the intermediate layer away from the porous substrate layer. The intermediate layer includes a metal oxide powder. The particle diameter of the metal oxide powder is less than the pore diameter of the porous substrate layer, and at least a portion of the metal oxide powder is embedded in the porous substrate layer. A method of preparing the separator and a lithium-ion battery including the separator are also provided.

17 Claims, No Drawings

SEPARATOR INCLUDING POROUS SUBSTRATE LAYER, METAL OXIDE INTERMEDIATE LAYER, AND CERAMIC COATING LAYER, METHOD OF PREPARING THE SAME AND LITHIUM-ION BATTERY INCLUDING THE SAME

CROSS-REFERENCE TO RELATED APPLICATION

This application claims the priority benefit of China application no. 202010199106.4, filed on Mar. 20, 2020. The entirety of the above-mentioned patent application is hereby incorporated by reference herein and made a part of this specification.

BACKGROUND

Technical Field

The disclosure relates to the field of chemical power supply and particularly relates to a separator, a method of preparing the same, and a lithium-ion battery including the same.

Description of Related Art

At present, the separator with a water-based ceramic coating layer is one of the mainstream methods used by domestic power battery manufacturers to improve battery safety performance. Such separator delivers advantages such as a simple and controllable coating process and less expensive prices. Nevertheless, when such separator having the water-based ceramic coating layer functions inside a batter, powder detachment may occur. Once the ceramic material particles are detached, the thickness of the separator becomes uneven, the internal current consistency becomes poor, and the battery cycle performance is thereby affected. The powder detachment problem of the ceramic coating layer is due to the material of the substrate layer being PE, PP and other polymers. This polyolefin material is a non-polar material. The force between the substrate layer and the binder is weak, the force between the substrate layer and the ceramic molecules is weak, and the effect of increasing the adhesion of the coating layer using only the binder is therefore limited.

SUMMARY

The disclosure provides a separator, a method of preparing the same, and a lithium-ion battery including the same.

An embodiment of the disclosure provides a separator including a porous substrate layer, an intermediate layer, and a ceramic coating layer, wherein the ceramic coating layer is disposed on a side of the intermediate layer away from the porous substrate layer. The intermediate layer includes a metal oxide powder. A particle diameter of the metal oxide powder is less than a pore diameter of the porous substrate layer, and at least a portion of the metal oxide powder is embedded in the porous substrate layer.

An embodiment of the disclosure further provides a method of preparing the separator, and the method includes the following steps. The metal oxide powder is deposited on a surface of the porous substrate layer through plasma physical vapor deposition to form the intermediate layer. The particle diameter of the metal oxide powder is less than the pore diameter of the porous substrate layer, and at least a portion of the metal oxide powder is embedded in the porous substrate layer. And, the ceramic coating layer is formed on a surface of the intermediate layer.

Another embodiment of the disclosure provides a lithium-ion battery including the separator.

DESCRIPTION OF THE EMBODIMENTS

The disclosure is further described in detail in combination with specific embodiments.

A separator provided by the disclosure includes a porous substrate layer, an intermediate layer, and a ceramic coating layer, wherein the ceramic coating layer is disposed on a side of the intermediate layer away from the porous substrate layer. The intermediate layer includes a metal oxide powder. A particle diameter of the metal oxide powder is less than a pore diameter of the porous substrate layer, and at least a portion of the metal oxide powder is embedded in the porous substrate layer.

In an exemplary embodiment, the intermediate layer has a thickness of less than or equal to 10 nm and a surface density of 0.01 to 0.08 $g/m^2$. The "thickness of the intermediate layer" provided in the disclosure refers to the thickness of the material in which the metal oxide powder is distributed. By limiting the thickness of the intermediate layer to be less than or equal to 10 nm and the surface density to be 0.01 to 0.08 $g/m^2$, a channel required by ion transmission is secured because the metal oxide powder having a small particle size may exhibit high bulk density, and excessively thick thickness (greater than 10 nm) or excessively high surface density (greater than 0.08 $g/m^2$) may lead to an increase in internal resistance of a battery. In the disclosure, the intermediate layer is disposed to acts as a transition layer, so that a nano-anchoring effect generated between the metal oxide powder having a small particle diameter in the intermediate layer and the ceramic coating layer coated on a surface of the intermediate layer may improve bonding strength between the ceramic coating layer and the porous substrate layer, and powder detachment is thereby prevented. The outer ceramic coating layer is a ceramic coating layer formed by commonly used coating methods. In an exemplary embodiment, a thickness and a surface density of the ceramic coating layer are be 2 to 5 μm and 3.5 to 4.5 $g/m^2$ respectively, and normal transmission of lithium ions may be satisfied when the provided coating thickness and surface density fall within such ranges.

The porous substrate layer may be a commonly used battery separator material, for example, may be polyethylene (PE), polypropylene (PP), polyamide (PA), or a composite film thereof. The intermediate layer and the ceramic coating layer may be formed on one surface or on two surfaces of the porous substrate layer. In an exemplary embodiment, the intermediate layer and the ceramic coating layer are formed on two surfaces of the porous substrate layer.

In an exemplary embodiment, the metal oxide powder is deposited on the surface of the porous substrate layer through plasma physical vapor deposition to form the intermediate layer. In a treating process, the plasma physical vapor deposition may be used to further refine the metal oxide powder and form nano-level or even smaller pores on the surface of the porous substrate layer. In this way, the metal oxide powder is deposited in the pores, and that the securely-combined intermediate layer is formed. According to the nano-anchoring effect, when plasma pretreatment is performed on the surface of the porous substrate layer to form the intermediate layer, bonding strength between ceramic material particles and the porous substrate layer may be improved, the problem that the ceramic material particles may be easily peeled off is prevented, and dispersibility of the ceramic material particles is improved. Further, after plasma surface treatment is performed, hydrophilicity (facilitation of electrolyte infiltration) and thermal dimensional stability of the porous substrate layer are both improved. In an exemplary embodiment, the particle diameter of the metal oxide powder in the intermediate layer is less than or equal to 10 nm. A particle diameter of a selected material for the metal oxide powder in the intermediate layer may be between 10 to 30 nm. The material may be refined through the plasma physical deposition technology, and in this way, the particle diameter of the obtained metal oxide powder in the intermediate layer may be less than or equal to 10 nm.

In an exemplary embodiment, the ceramic coating layer is selected from graded ceramic material particles. The graded ceramic material particles may include 5 to 10 parts by weight of small particles, 30 to 70 parts by weight of medium particles, and 5 to 10 parts by weight of large particles. The small particles are ceramic material particles with D50=0.3 to 0.9 μm, the medium particles are ceramic material particles with D50=1.5 to 4 μm, and the large particles are ceramic material particles with D50=5 to 10 μm. Such grading manner allows the small particles in the ceramic coating layer to be well filled in the gaps between the medium particles and the large particles of the ceramic material particles. Even if the temperature exceeds a glass transition temperature of a ceramic layer binder, that is, binder failure occurs, the small particles may still provide a supporting function at this time. A structure and a shape of the ceramic structure are thus stably kept, and high temperature resistance of the separator is thereby improved.

The ceramic coating layer further includes a binder, and preferably an aqueous binder.

Materials selected for a metal oxide in the intermediate layer and the ceramic material particles in the ceramic coating layer may be identical or may be different. The metal oxide may be selected from one or plural of $Al_2O_3$, $SiO_2$, $TiO_2$, and $ZrO_2$, and the ceramic material of the ceramic material particles may be selected from one or plural of $Al_2O_3$, $SiO_2$, $TiO_2$, $ZrO_2$, and BN. Aluminium oxide is preferred.

The separator provided by the disclosure may be prepared through the following method. The metal oxide powder is deposited on the surface of the porous substrate layer through plasma physical vapor deposition to form the intermediate layer. The particle diameter of the metal oxide powder is less than the pore diameter of the porous substrate layer, and at least a portion of the metal oxide powder is embedded in the porous substrate layer. And, the ceramic coating layer is formed on a surface of the intermediate layer.

The disclosure further provides a lithium-ion battery including the separator.

In the disclosure, the separator is formed by a three-layer structure of the porous substrate layer-intermediate layer-ceramic coating layer. In the intermediate layer, a particle diameter of the metal oxide powder is less than the ion transmission pore diameter of the porous substrate layer. The metal oxide powder is deposited in pores, so that the intermediate layer securely combined with the porous substrate layer is formed. Further, a nano-anchoring effect generated between the metal oxide powder having a small particle diameter in the intermediate layer and the ceramic coating layer coated on a surface of the intermediate layer may improve bonding strength between the ceramic coating layer and the porous substrate layer, and powder detachment is thereby prevented.

Specific examples are provided below to illustrate the disclosure in detail. Nevertheless, these examples are exemplary only and do not intend to limit the protection scope of the disclosure.

In the following embodiments, the reagents, materials, and instruments used may all be commercially available unless otherwise specified.

Embodiment 1

Gas-phase alumina powder particles with an average particle diameter of 30 nm are configured as a suspension and are injected into an atomizer. After entering the atomizer to bring out small droplets of the suspension, auxiliary gas enters a nozzle region. At the same time, plasma equipment is discharged, and the nozzle performs plasma treatment on a PP substrate layer. Herein, the temperature of the atomizer is set at 80° C., the atmosphere is air, and the flow rate is 2 L/min. The plasma discharge voltage is set to 500V, discharge treatment is performed for 3 times, the moving speed of the nozzle is 500 mm/min, and a pretreated PP substrate layer having an intermediate layer is obtained. Aluminum oxide powder having D50 less than 5 μm is evenly mixed with pure water and is then configured as a suspension with a solid content of 30 wt %, and 3% by mass of a dispersant (AP) with respect to the mass of aluminum oxide powder is added next. Stirring for dispersion is performed for 10 minutes, and 3% by mass of a polyacrylate binder with respect to the mass of aluminum oxide powder is added. Stirring for dispersion is then performed for another 10 minutes, and a ceramic paste material is prepared. The ceramic paste material is coated on a surface of the pretreated PP separator by micro-concave coating and is dried to form a 5 μm ceramic coating layer.

Embodiment 2

Gas-phase alumina powder particles with an average particle diameter of 10 nm are configured as a suspension and are injected into an atomizer. After entering the atomizer to bring out small droplets of the suspension, auxiliary gas enters a nozzle region. At the same time, plasma equipment is discharged, and the nozzle performs plasma treatment on a PE substrate layer. Herein, the temperature of the atomizer is set at 60° C., the atmosphere is air, and the flow rate is 1 L/min. The plasma discharge voltage is set to 230 V, discharge treatment is performed for 1 time, the moving speed of the nozzle is 100 mm/min, and a pretreated PE substrate layer having an intermediate layer is obtained. Aluminum oxide powder (D10=0.8 μm, D50=3.6 μm, D90=9.2 μm) is evenly mixed with pure water and is then configured as a suspension with a solid content of 20 wt %, and 10% by mass of a dispersant with respect to the mass of alumina oxide powder is added next. Stirring for dispersion is performed for 10 minutes, and 1% by mass of a polyacrylic binder with respect to the mass of aluminum oxide powder is added. Stirring for dispersion is then performed for another 10 minutes, and a ceramic paste material is prepared. The ceramic paste material is coated on a surface of a pretreated PE separator by micro-concave coating and is dried to form a 3 μm ceramic coating layer.

Embodiment 3

Gas-phase alumina powder particles with an average particle diameter of 20 nm are configured as a suspension and are injected into an atomizer. After entering the atomizer to bring out small droplets of the suspension, auxiliary gas enters a nozzle region. At the same time, plasma equipment is discharged, and the nozzle performs plasma treatment on a PE substrate layer. Herein, the temperature of the atomizer is set at 40° C., the atmosphere is air, and the flow rate is 0.5 L/min. The plasma discharge voltage is set to 100 V, discharge treatment is performed for 2 times, the moving speed of the nozzle is 200 mm/min, and a pretreated PE substrate layer is obtained. Aluminum oxide powder having D50 less than 2 μm is evenly mixed with pure water and is then configured as a suspension with a solid content of 10 wt %, and 0.1% by mass of a dispersant with respect to the mass of aluminum oxide powder is added next. Stirring for dispersion is performed for 10 minutes, and 0.1% by mass of a polyacrylate binder with respect to the mass of aluminum oxide powder is added. Stirring for dispersion is then performed for another 10 minutes, and a ceramic paste material is prepared. The ceramic paste material is coated on a surface of a pretreated PE separator by micro-concave coating and is dried to form a 2 μm ceramic coating layer.

The following tests are performed on the separators obtained through Embodiments 1 to 3.

Coating Layer Peeling Force Test

A pressure-sensitive tape is used for measurement. A peeling width is 25 mm, a length is 70 mm, and a speed is 10 mm/min.

Monolithic Battery Assembly and Battery Performance Test

One piece of double-side-coated cathode in a ternary system is provided. Two pieces of single-side-coated anode is provided. And, a liquid injection amount is 2 mL. Formation into a constant volume is performed after sealing, and a LANHE Electronic battery testing system is used by test equipment.

25° C. DCR: the experiment is conducted in a 25° C. temperate box. Charging with 1 C of current is performed, discharging with 1 C of current is then performed, and DC internal resistance at 50% SOC is calculated.

60° C. Cycle: the experiment is conducted in a 60° C. temperate box. First, constant current and constant voltage charging is performed, wherein the battery is charged with 0.3 C of constant current to 4.3V, then is charged with 4.3V of constant voltage until a cut-off current is 0.05 C. Next, constant current discharging is performed, wherein the battery is discharged with 0.3 C of constant current to 2.75 V. Such cycle is repeated for 100 times, and a discharging capacity of each time is recorded.

Thermal Shrinkage Test

A separator of 120 mm×120 mm is used, a mark of 100 mm×100 mm is made on the separator, and heat is preserved at 150° C. for 1 hour. Changes in length in the MD direction and the TD direction are measured after the separator is taken out.

Test results are shown in Table 1.

TABLE 1

|  | Embodiment 1 | Embodiment 2 | Embodiment 3 |
| --- | --- | --- | --- |
| Coating Layer Adhesion Force (N/m) | 226.4 | 241.0 | 334.3 |
| 25° C. DCR (mΩ) | 500.1 | 322.0 | 327.8 |
| 60° C. Capacity Retention Rate (%) for 100 Cycles | 81.1 | 88.6 | 89.1 |

TABLE 1-continued

|  | Embodiment 1 | Embodiment 2 | Embodiment 3 |
| --- | --- | --- | --- |
| 150° C./1 h Thermal Shrinkage (%) | MD 2.8 TD 1.9 | MD 1.3 TD 0.7 | MD 3.2 TD 2.6 |

Based on the data shown in Table 1, it can be seen that in the separator provided by the disclosure, the coated layer exhibits favorable adhesion and thermal stability, and thus, powder detachment may not occur easily when the cycle is repeated. High capacity retention rate is kept after 100 cycles.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A separator, comprising:
a porous substrate layer;
an intermediate layer, wherein the intermediate layer comprises a metal oxide powder, a particle diameter of the metal oxide powder is less than a pore diameter of the porous substrate layer, and at least a portion of the metal oxide powder is embedded in the porous substrate layer; and
a ceramic coating layer, wherein the ceramic coating layer is disposed on a side of the intermediate layer away from the porous substrate layer, wherein the ceramic coating layer comprises ceramic material particles, the ceramic material particles comprise 5 to 10 parts by weight of small particles, 30 to 70 parts by weight of medium particles, and 5 to 10 parts by weight of large particles,
the small particles are ceramic material particles with D50=0.8 μm, the medium particles are ceramic material particles with D50=3.6 μm, and the large particles are ceramic material particles with D50=9.2 μm.

2. The separator according to claim 1, wherein the porous substrate layer comprises one or plural of polyethylene, polypropylene, and polyamide.

3. The separator according to claim 1, wherein the intermediate layer has a thickness of less than or equal to 10 nm and a surface density of 0.01 to 0.08 g/m².

4. The separator according to claim 1, wherein the ceramic coating layer has a thickness of 2 to 5 m and a surface density of 3.5 to 4.5 g/m².

5. The separator according to claim 1, wherein the ceramic coating layer further comprises an aqueous binder.

6. The separator according to claim 1, wherein the ceramic coating layer comprises a ceramic material, and wherein a metal oxide of the metal oxide powder is identical to or different from the ceramic material;

the metal oxide is selected from one or plural of $Al_2O_3$, $SiO_2$, $TiO_2$, and $ZrO_2$, and the ceramic material is selected from one or plural of $Al_2O_3$, $SiO_2$, $TiO_2$, $ZrO_2$, and BN.

7. The separator according to claim 6, wherein the metal oxide is $Al_2O_3$, and the ceramic material is $Al_2O_3$.

8. The separator according to claim 1, wherein the particle diameter of the metal oxide powder is less than or equal to 10 nm.

9. The separator according to claim 8, wherein the ceramic coating layer comprises a ceramic material, and wherein a metal oxide of the metal oxide powder is identical to or different from the ceramic material;

the metal oxide is selected from one or plural of $Al_2O_3$, $SiO_2$, $TiO_2$, and $ZrO_2$, and the ceramic material is selected from one or plural of $Al_2O_3$, $SiO_2$, $TiO_2$, $ZrO_2$, and BN.

10. The separator according to claim 9, wherein the metal oxide is $Al_2O_3$, and the ceramic material is $Al_2O_3$.

11. A lithium-ion battery, comprising the separator according to claim 1.

12. The lithium-ion battery according to claim 11, wherein the intermediate layer has a thickness of less than or equal to 10 nm and a surface density of 0.01 to 0.08 $g/m^2$.

13. The lithium-ion battery according to claim 11, wherein the ceramic coating layer has a thickness of 2 to 5 m and a surface density of 3.5 to 4.5 $g/m^2$.

14. The lithium-ion battery according to claim 11, wherein the particle diameter of the metal oxide powder is less than or equal to 10 nm.

15. A method of preparing the separator according to claim 1, comprising:

depositing the metal oxide powder on a surface of the porous substrate layer through plasma physical vapor deposition to form the intermediate layer, wherein the particle diameter of the metal oxide powder is less than the pore diameter of the porous substrate layer, and the portion of the metal oxide powder is embedded in the porous substrate layer; and forming the ceramic coating layer on a surface of the intermediate layer.

16. The method of preparing the separator according to claim 15, wherein the intermediate layer has a thickness of less than or equal to 10 nm and a surface density of 0.01 to 0.08 $g/m^2$.

17. The method of preparing the separator according to claim 15, wherein the particle diameter of the metal oxide powder is less than or equal to 10 nm.

* * * * *